Nov. 28, 1950
J. POWELL
2,532,191
SEED PLANTING MACHINE
Filed July 8, 1947
2 Sheets-Sheet 2
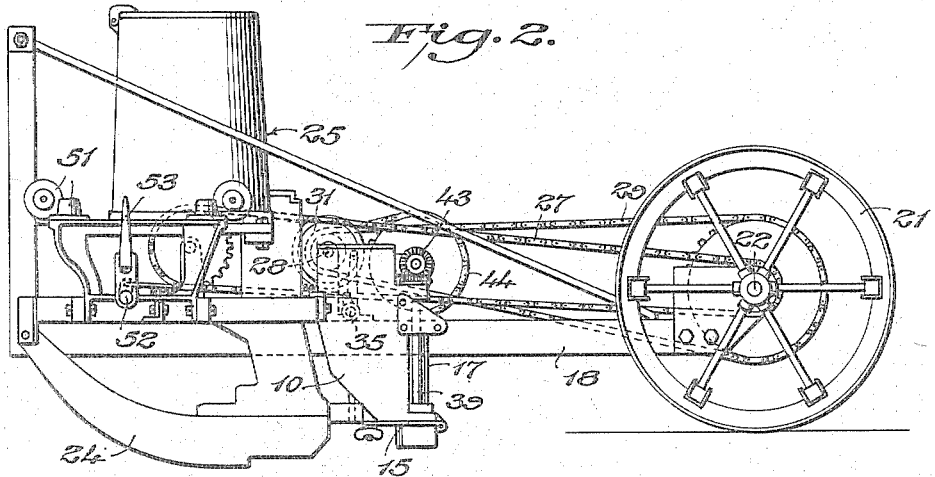
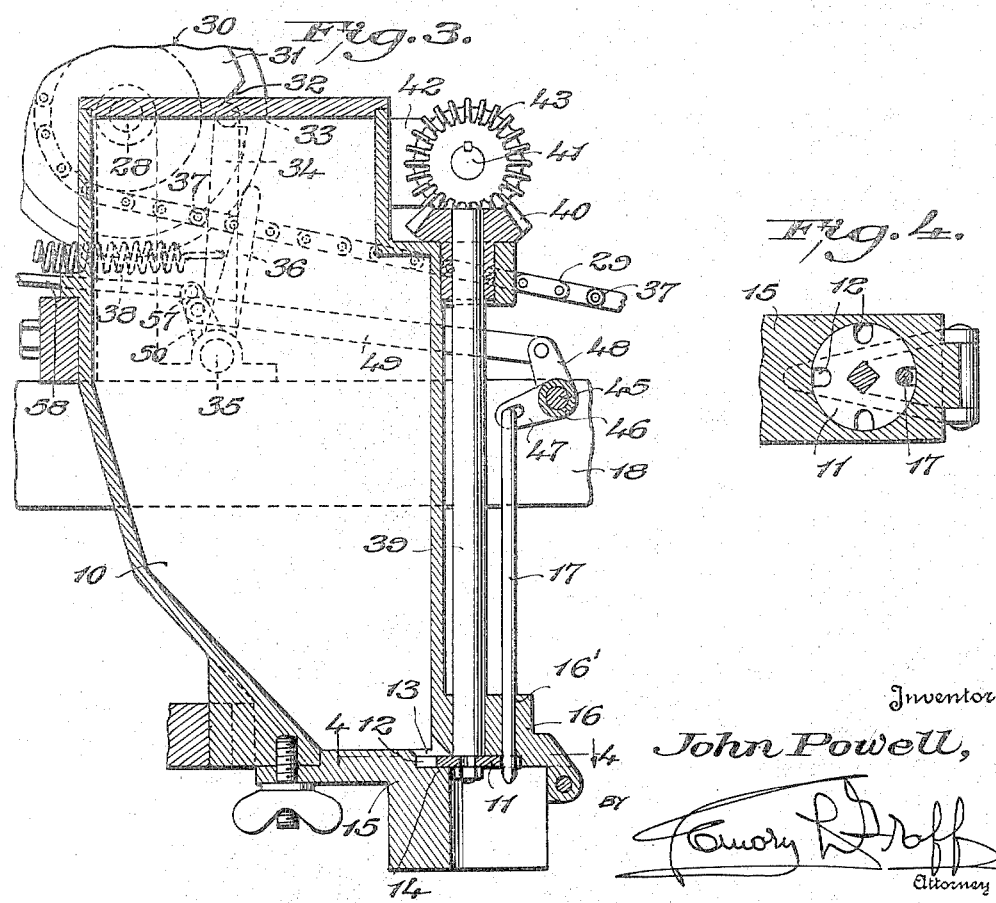
Inventor
John Powell, Patented Nov. 28, 1950

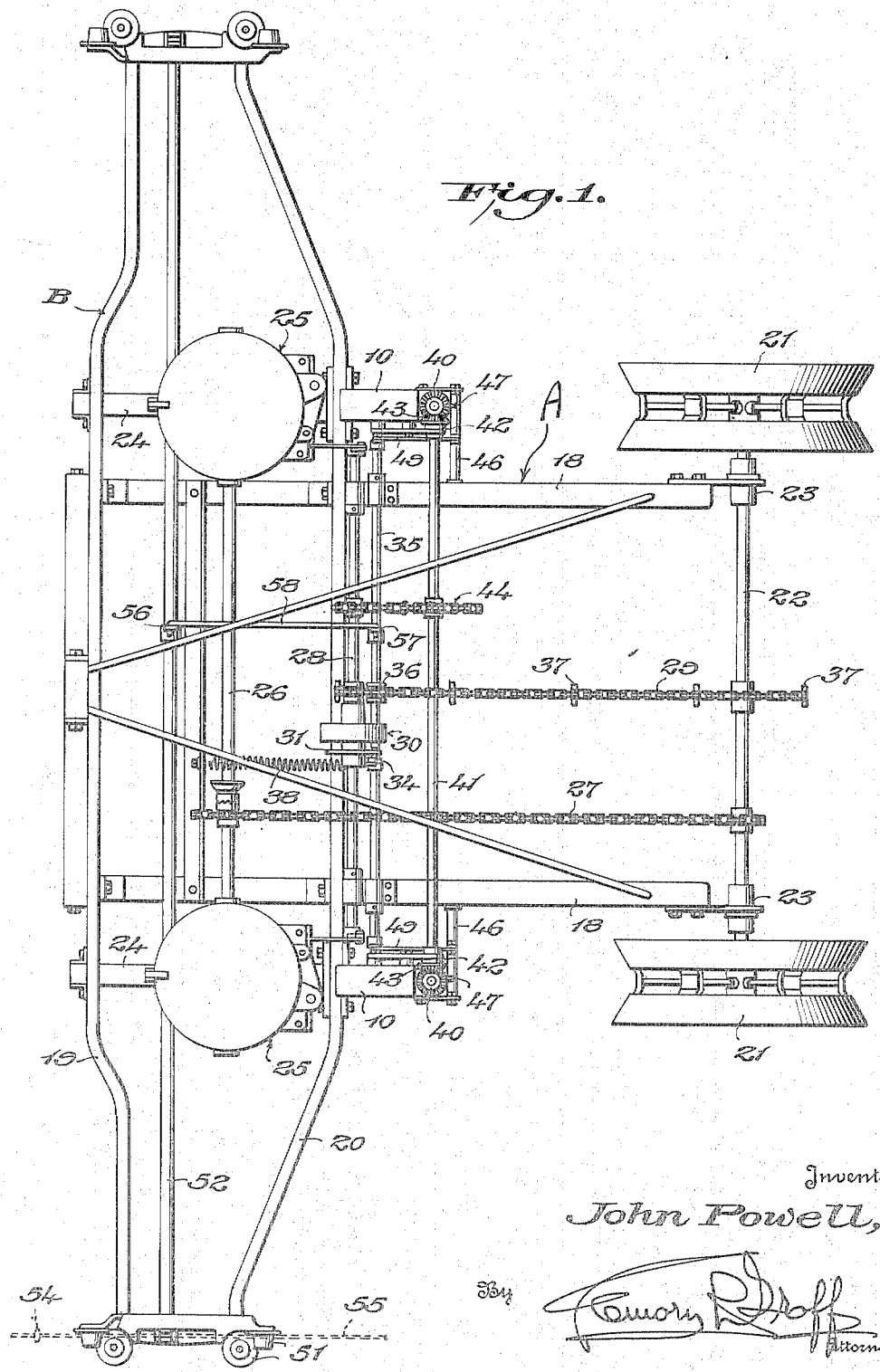

2,532,191

UNITED STATES PATENT OFFICE 2,532,191

SEED PLANTING MACHINE

John Powell, Kokomo, Ind.

Application July 8, 1947, Serial No. 759,656

1 Claim. (Cl. 111—37)

This invention relates to seed planting machines, and has particular reference to a machine which is specially designed for planting tomato and like light weight seeds.

Conventional seed planting machines which depend for their operation upon seeds being dropped therefrom under the influence of gravity, cannot be used successfully for planting tomato and like seeds for the reason that such seeds, because of their light weight and tendency to adhere to one another, do not readily separate and drop, either singly or in small numbers, under the influence of gravity.

Accordingly, the primary object of the present invention is to provide a seed planting machine which includes means to effect forcible and positive ejection of seeds therefrom, whereby it is well adapted for the successful planting of tomato and like light weight seeds.

Another special and important object of the present invention is to provide a seed planting machine with simple, practical and reliable means for effecting positive ejection of seeds therefrom, either according to hill drop or check row planting, as desired.

Another special and important object of the present invention is to provide means in the form of an attachment for, and which may readily be applied to, certain conventional types of seed planting machines to adapt them to effect forcible and positive dropping of seeds.

With the foregoing and other objects in view, which will become more fully apparent as the nature of the invention is better understood, the same consists in a seed planting machine embodying the novel features of construction, combination, and arrangement of parts as will be hereinafter more fully described, illustrated in the accompanying drawings and defined in the appended claims.

In the accompanying drawings, in which like characters of reference denote corresponding parts in the different views:

Figure 1 is a top plan view of a seed planting machine embodying the invention;

Figure 2 is a side elevation of the machine;

Figure 3 is a vertical secton on an enlarged scale through one of the seed hoppers and its related positively acting seed ejecting mechanism; and Figure 4 is a horizontal section on the line 4—4 of Figure 3.

Referring to the drawings in detail, first with particular reference to Figures 3 and 4 of the drawings, it will be observed that a seed dropping mechanism constructed in accordance with the invention comprises a hopper 10 to contain the seeds to be dropped, and a rotatable, marginally pocketed disc 11, the pockets 12 of which are adapted to receive seeds from the hopper 10 and to transfer them to a position to be dropped as a consequence of rotation of said disc.

While the disc 11 may be disposed in any suitable manner relative to the hopper 10, it preferably is disposed horizontally at the bottom of said hopper in a position such that its front marginal portion either extends into the bottom portion of said hopper or underlies a small outlet opening 13 leading from the bottom of said hopper, and its rear marginal portion overlies a free space rearwardly of said hopper through which the seeds may drop to the soil. In any event, the pockets 12 extend through the disc 11 and the arrangement is such that rotation of said disc results in its pockets being successively moved to a position to become filled with seeds from the hopper 10 and from that position to the seed dropping position.

To prevent the seeds from dropping from the pockets 12 during travel of said pockets between their seed receiving position and their seed dropping position, a suitable wall 14 underlies the pocketed marginal portion of the disc 11 between said positions. The wall 14 may be constituted by, for example, a top portion of a bottom closure 15 for the hopper 10, and the disc 11 may appropriately be disposed in a circular recess formed in part in the top of said bottom closure 15 and in part in the bottom of a rearward projection 16 of the hopper 10 at the bottom thereof.

The disc 11 may have only a single pocket 12 and may be rotatable through an angle of 180° to move its pocket between its seed receiving and its seed dropping position, or it may have any suitable plurality of pockets equally spaced apart angularly and may be rotatable through an angle of lesser than 180°, depending upon the number of its pockets, to bring one pocket to the seed receiving position and another pocket simultaneously to the seed dropping position. In the present instance, the disc 11 is illustrated as having four pockets 12. Therefore, rotation of said disc through an angle of 90° will result in one pocket 12 being moved to a position to receive seeds from the hopper 10 and in another pocket 12 being moved to a position to drop to the soil seeds which it has previously received from the hopper 10.

The present seed dropping mechanism further includes means to positively eject seeds from each pocket 12 when it moves to the seed dropping position so as to insure dropping of the seeds even though they might tend for any reason to remain in the pocket 12 rather than to gravitate therefrom. This means comprises a vertically disposed, reciprocable plunger 17, the lower end portion of which is movable downwardly into each seed pocket 12 to eject the seeds therefrom as each pocket moves to its seed dropping position. Appropriately, the lower end portion of said plunger 17 may be disposed in a guide opening 16' in the hopper projection 16 whereby it is properly positioned and guided to effect ejection of seeds from the pockets 12 when the latter move to the seed dropping position.

A machine constructed in accordance with the invention may include only a single seed dropping mechanism or any desired plurality of such mechanisms, as well as any desired means for intermittently rotating the disc, or discs, 11, and actuating the plunger, or plungers, 17 to insure dropping of the seeds at desired spaced intervals as the machine is advanced. Moreover, said seed dropping mechanism, or mechanisms, may be applied to an existing machine of any suitable type adapted to accommodate the same, or may be made a part, or parts, of a machine specially constructed to accommodate the same.

The drawings illustrate a machine embodying two of the present seed dropping mechanisms mounted in spaced apart relationship laterally with respect to each other a distance corresponding to the lateral spacing of a pair of rows to be planted, and the machine is of a type such that the planting or dropping of the seeds may be effected either by the hill drop method or by the well known check row method.

The machine comprises a main, longitudinally extending frame, designated generally as A, and an auxiliary, transversely extending frame, designated generally as B. The main frame A includes a pair of side rails 18, 18 and the auxiliary frame B includes front and rear rails 19 and 20, respectively, which are superimposed upon and suitably fastened to the main frame side rails near their forward ends.

At its rear end the machine is supported by wheels 21 fixed to the ends of a transverse axle 22 which is journaled for rotation in suitable bearings 23 carried by the side rails 18, 18 at or near their rear ends, while at its front end the machine may be supported in any suitable manner as, for example, by means of a pair of furrow forming plows 24, constituting parts of a pair of fertilizer dropping mechanisms, designated generally as 25, 25, mounted on the auxiliary frame B adjacent to the sides of the main frame A, one in advance of each of the seed dropping mechanisms.

While fertilizer dropping mechanisms preferably are employed in conjunction with the present seed dropping mechanisms to drop fertilizer in advance of dropping of the seeds, they are not essential and, in any event, form no part of the present invention. Therefore, they are not illustrated in detail. Suffice it to say that if they are provided any suitable means may be provided for operating them in any desired manner.

In the present instance, the means for operating the fertilizer dropping mechanisms 25, 25, comprises a first or agitator actuating shaft 26 connecting said mechanisms together and driven from the axle 22 by the sprocket gearing 27, and a second or clutch shaft 28 for the intermittent actuation of said mechanisms likewise driven from the axle 22 by a sprocket gearing 29 through a slip clutch 30.

The slip clutch 30 includes a disc 31 having a peripheral recess 32 in which is engageable a stop pin 33 on the upper end of a rocker arm 34 which is mounted at its lower end on a rocker shaft 35 which extends transversely of the main frame A and is journaled in suitable bearings carried by said main frame. When the stop pin 33 is disposed in the recess 32, the shaft 28 is held from turning, but when said stop pin is withdrawn from said recess, said shaft is turned.

Fixed to and extending from the rocker shaft 35 upwardly to the lower reach of the chain of the sprocket gearing 29 is a second arm 36, the upper end of which is free and adapted to be engaged and swung rearwardly by each of a plurality of lugs 37 or the like on said chain as they move rearwardly with the said lower reach of said chain.

A suitable spring 38 tends constantly to swing the arm 36 forwardly. Thus, as the machine advances, each lug 37 acts to rock the arm 36 rearwardly to withdraw the stop pin 33 from the recess 32 in the clutch disc 31 and to permit the shaft 28 to make a complete revolution, whereupon the spring 38 rocks the arm 36 forwardly to cause the stop pin 33 again to enter the recess 32 and to hold said shaft 28 against rotation until the next lug 37 rocks the arm 36 rearwardly, whereupon the shaft 28 again makes a complete revolution. In other words, as the machine advances, the shaft 28 is caused to partake of a single, complete revolution at intervals depending upon the spacing of the lugs 37.

The disc 11 of each seed dropping mechanism is mounted on the lower end of a vertical shaft 39 which is journaled for rotation in suitable bearings carried by the hopper 10 and which carries at its upper end a miter gear 40.

A transversely extending shaft 41 is journaled for rotation in suitable bearings 42 and at its ends carries miter gears 43 which are in mesh with the miter gears 40 of the two seed dropping mechanisms.

Suitable gearing, such as the sprocket gearing designated as 44, connects the shaft 28 with the shaft 41 so that the latter is driven by the former. In the present instance, this gearing 44 has a four-to-one ratio so that for a complete rotation of the shaft 28, the shaft 41 is rotated through an angle of 90° and rotates the shafts 39 through angles of 90°. In this connection, the arrangement of the pockets 12 in the discs 11 is such that each time the shafts 39 are rotated through angles of 90°, a pocket 12 of each disc 11 containing seeds to be dropped is moved to the seed dropping position and an empty pocket is moved to a position to receive seeds from the hopper 10.

Behind each shaft 39 is suitably mounted a short horizontal, transversely extending shaft 45 on which is rotatably mounted a sleeve 46. On each sleeve 46 is an arm 47 with which the upper end of the plunger 17 of the related seed dropping mechanism is connected. Also on each sleeve 46 is another arm 48 which is connected by a link 49 with a related arm 50 on the rocker shaft 35. The arrangement in this respect is such that each time the rocker shaft 35 is rocked rearwardly the plunger 17 is lifted to subsequently be projected downwardly as said shaft 35 is rocked forwardly by the spring 38 when the stop pin 33 on the arm 34 enters the recess 32 in the clutch disc 31.

Summarizing, it will be apparent that as the machine advances, the plungers 17 will first be lifted, the discs 11 then will be rotated through angles of 90° to bring filled pockets 12 beneath the lower ends of said plungers to the seed dropping positions and to bring empty pockets to positions to receive seeds from the hoppers 10, and then the plungers 17 will be projected downwardly to positively eject seeds from the pockets 12 which have been brought to the seed dropping positions. This sequence of operation will, of course, be repeated at regular intervals as the machine advances.

The described operation of the machine is in accordance with the so-called "hill drop" method of planting. However, the machine illustrated may, if desired, be operated according to the well known check wire method of planting simply by removing the lugs 37 from the chain of the sprocket gearing 29 and employing a check wire in lieu of said lugs.

To adapt the machine for check wire operation, the ends of the auxiliary frame B are provided with check wire guide rollers 51 and with suitable bearings in which is journaled a horizontal shaft 52 which extends transversely of the machine. On each end of this shaft is an upstanding arm 53 with which the buttons 54 of a check wire 55 are engageable whereby said shaft is rocked rearwardly each time a button 54 engages one of said arms. On the shafts 52 and 35 are arms 56 and 57, respectively, which are connected together by a link 58 so that each time the shaft 52 is rocked by a check wire button, the shaft 35 also is rocked and thereby the same results are accomplished as are accomplished by rocking of said shaft 35 by the lugs 37 on the chain of the sprocket gearing 29. It will thus be seen that the present machine may readily be operated according to either the hill drop method or the check wire method, as desired, and that in either case it insures positive dropping of the seeds.

Without further description, it is believed that the construction and operation of the machine will be clearly understood and its advantages appreciated It is desired to point out, however, that while only a single specific structural embodiment of the invention has been illustrated and described, the same is readily capable of embodiment in specifically different structures within its spirit and scope as defined in the appended claim.

I claim:

A seed planting machine comprising a seed hopper, a rotatable member having seed accommodating pockets therein and mounted so that by rotation thereof said pockets receive seeds from said hopper and transfer them to a seed dropping position, a plunger for ejecting seeds from said pockets when the latter are in said seed dropping position, wheels supporting said machine, a slip clutch driven continuously by said wheels during advance of the machine, a clutch shaft, said clutch including a disk fixed to said clutch shaft so that when said disk is held against rotation said clutch shaft is held against rotation and so that when said disk is released said clutch shaft is rotatable with said clutch, said disk having therein a peripheral recess, a rock shaft, an arm fixed to said rock shaft, an element on said arm, yieldable means tending constantly to swing said arm in a direction to urge said element against the periphery of said disk so that when the recess in said disk registers with said element the latter is caused to enter said recess to hold said disk and said clutch shaft against rotation and said rock shaft is rocked in one direction, means operable during advance of the machine to periodically swing said arm to withdraw said element from said recess and to rock said rock shaft in the opposite direction so that said clutch shaft is rotatable intermittently, a driving connection between said clutch shaft and said rotatable member whereby the latter is rotated intermittently during advance of the machine to bring said pockets successively to the seed dropping position, and a connection between said rock shaft and said plunger whereby the latter is projected to eject seeds from a pocket when the element on said arm enters said recess and is retracted when said arm is swung to withdraw said element from the recess in said disk.

JOHN POWELL.

REFERENCES CITED

The following references are of record in the file of this patent:

UNITED STATES PATENTS

| Number | Name | Date |
| --- | --- | --- |
| 658,450 | Kettler | Sept. 25, 1900 |
| 930,831 | Brinkoeter | Aug. 10, 1909 |
| 1,062,787 | Moore | May 27, 1913 |
| 1,076,145 | Murphey | Oct. 21, 1913 |
| 1,189,019 | Twito | June 27, 1916 |
| 1,616,933 | Traphagen | Feb. 8, 1927 |
| 1,725,631 | Gould | Aug. 20, 1929 |
| 1,814,069 | Witte | July 14, 1931 |
| 2,103,129 | White | Dec. 21, 1937 |
| 2,123,223 | Ayars | July 12, 1938 |